Patented Sept. 3, 1946

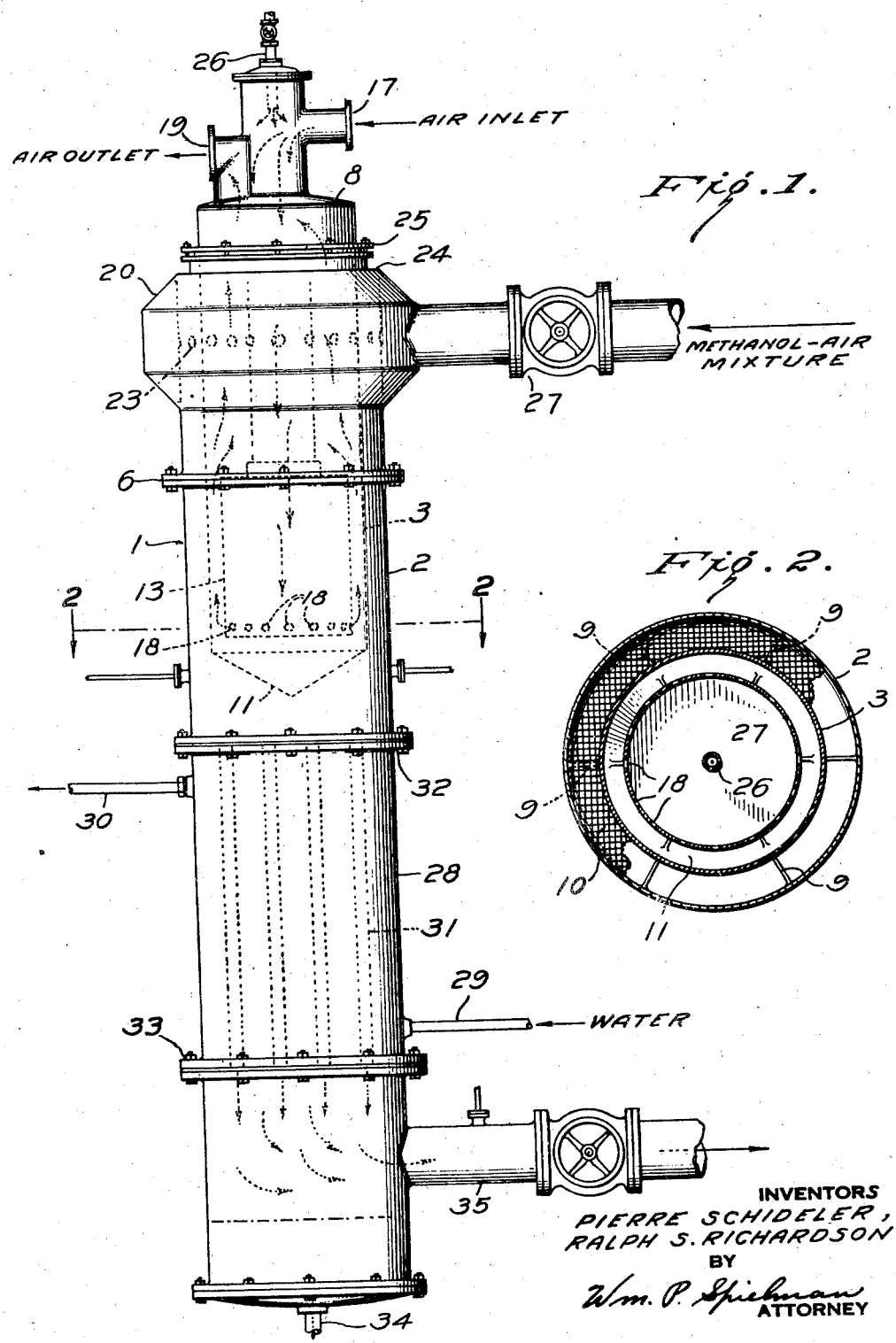

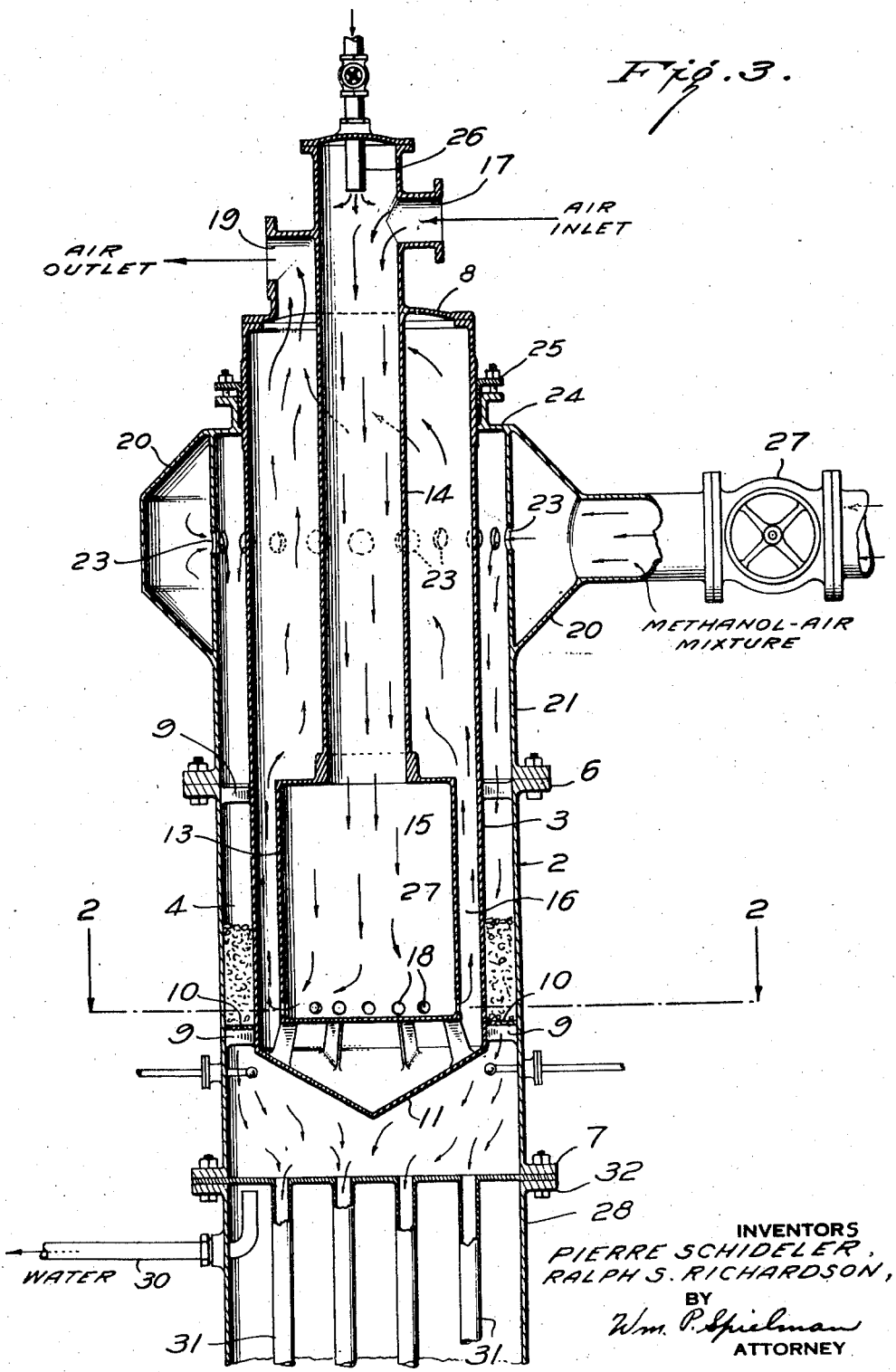

2,406,908

UNITED STATES PATENT OFFICE 2,406,908

APPARATUS FOR THE MANUFACTURE OF FORMALDEHYDE

Pierre Schideler, New York, and Ralph S. Richardson, Scarsdale, N. Y., assignors to Chemical Construction Corporation, New York, N. Y., a corporation of Delaware Application November 28, 1942, Serial No. 467,258

2 Claims. (Cl. 23—288)

This invention relates to the manufacture of formaldehyde by the catalytic conversion or oxidation of methanol vapor and has as its object the provision of a method and apparatus for controlling the reaction temperature in relatively large sizes of burner units. The method is further characterized by the provision of means for the sudden cooling of the products of the reaction.

In modern formaldehyde manufacture it is now the practice to carry out the partial combustion of methanol in the presence of catalysts containing copper, silver or other mild oxidation catalysts. The reaction between methanol and oxygen may produce not only formaldehyde and water but also carbon oxides, water and carbon if the temperature of the reaction is not maintained suitably. It is customary, therefore, to control the heat of reaction by circulating through the catalyst a methanol-air mixture containing a considerable excess of methanol vapor and to use a large number of converters of relatively small dimensions and low capacity so that the heat generated by the reaction may be dissipated from the surface of the converters without causing an undesirable high catalyst temperature.

The necessity of employing a large number of converters of small size is avoided by the present invention, which provides a method and apparatus for obtaining close control of the reaction temperatures throughout the entire volume of the catalyst bed. We have found that the course of the partial oxidation of methanol to formaldehyde in the presence of a catalyst such as copper, silver and the like can be closely controlled at the optimum temperature values by employing a catalyst bed in the form of a relatively narrow annulus through which the reaction gas mixture is passed longitudinally while applying a temperature regulating gas to one or both of the outer surfaces of the annulus. This method provides both for the application of a cooling gas to prevent undue temperature rise during operation of the converter and the application of a heating gas in the same manner when starting up the converter or at any other time that additional heating may be necessary. By this method it is possible to obtain a large daily output of formaldehyde in a converter of very large unit capacity, thus simplifying the operating conditions within the plant. In fact, there is no present limitation to the size of unit which may be constructed.

The process of our invention therefore comprises the steps of passing a gas mixture containing methanol and air or other oxygen-containing gas with or without diluents of any desired type, longitudinally through a relatively narow vertical catalyst annulus while passing a stream of temperature regulating gas such as hot or cold air or hot products of combustion at relatively high velocity in heat exchange relation with one or both of the vertical surfaces of the annulus, preferably in a direction opposite to that of the flow of the reaction gas mixture. The hot gas mixture from the catalyst is then passed into a cooler which is preferably constructed as an integral part of the converter, and after the preliminary cooling step the mixture may be passed to a recovery system adapted to absorb the remaining formaldehyde in water and to recover for reuse any unconverted methanol if desired.

Our invention will be illustrated in greater detail with reference to the accompanying drawings, which show a catalytic converter employing the principles thereof. This converter also contains a number of features of design and construction which constitute an important part of our invention, as will subsequently be explained. On the drawings, Fig. 1 is a diagrammatic elevation of one embodiment of the converter of our invention in which the internal assembly is shown in dotted lines;

Fig. 2 is a section on the line 2—2 of Fig. 1; and,

Fig. 3 is a vertical section of a part of the assembly of Fig. 1 on a slightly larger scale.

Referring to Figs. 1 and 3 the converter designated generally by reference numeral 1 comprises two vertical concentric shells 2 and 3 which define a vertical annulus 4 containing an annular bed of catalyst of any suitable composition. The outer shell 2 is flanged at its upper and lower edges 6 and 7 while the inner shell 3 is extended upwardly beyond the outer shell and terminates against a cover plate 8 having an outlet 19 therein. The outer and inner shells 2 and 3 are rigidly fastened together by two sets of radial bars 9 as is more clearly shown in Fig. 2. An annular screen 10 divided in sections is supported on the lower of the two sets of bars 9 and serves to retain the catalyst while permitting passage of the oxidation products therethrough.

The inner shell 3 contains a removable baffle structure 13 which is separated from the gases leaving the catalyst by partition 11 and is adapted to direct and maintain a flow of temperature regulating gas at relatively high velocity over the inner surface of the inner shell 3 in a direction countercurrent to that of the flow of the reaction gases over the catalyst.

The vertical baffle structure consists essentially of a vertical tube 14, the lower end of which is enlarged as at 15 to form with the tube 3 a relatively narrow annular channel 16. The upper end of the tube 14 is provided with gas inlet 17 while a series of perforations 18 at its enlarged lower end serve to project streams of cooling gas against the inner wall of the annulus formed by the shell 3 at an area adjacent the lower part of the catalyst. The temperature regulating gas then passes upwardly through the narrow channel 16 and is removed through the outlet 19.

The reaction gas mixture is admitted to the converter through gas-distributing pipe 20 which surrounds a flanged cylindrical shell 21 mounted on the upper flange 6 of the outer converter shell 3 and which is provided with a series of holes 23 of suitable diameter for even distribution of the incoming gas mixture. The upper part of the cylindrical shell 21 is turned inwardly as at 24 and provided with a packing ring 25 to fit tightly against the upper portion of the inner converter shell 3 and form therewith a gas inlet passage in communication with the catalyst chamber 4.

In order to preheat the catalyst to reaction temperatures in starting up the converter, the central baffle structure 14 is provided with a gas inlet pipe 26 which terminates in a combustion chamber 27 formed by the enlarged lower portion 15 of the pipe 14. Hydrocarbon gas or other fuel entering through the pipe 26 is ignited through a port (not shown) and burned by air admitted through the inlet pipe 17, and the passage of the hot products of combustion through the chamber 27 and holes 18 and channel 16 heats the catalyst to the proper temperature. Heat may be applied to the catalyst in this manner when starting up the converter and may also be employed whenever the partial combustion of methanol is not sufficient to heat the catalyst to the desired operating temperature.

Improved yields of formaldehyde accompanied by considerably smaller quantities of undesirable byproducts are obtained when the hot reaction gas mixture from the catalyst is cooled immediately with a minimum of exposure to hot catalytic surfaces. We therefore provide a cooler 28 as a part of the catalytic converter. This cooler may advantageously be in the form of a tubular condenser provided with a water-inlet 29, a water outlet 30 and a large number of vertical cooling tubes extending between upper and lower headers 32 and 33 and serving to produce a rapid cooling of the reacted gases. Condensate formed in the tubes 31 can be removed through pipe 34 while the relatively cooled gases are taken off through outlet pipe 35 and may be passed to any suitable absorbing apparatus for the separation of unconverted methanol and recovery of formaldehyde. In some cases a direct cooler in the form of a small packed tower provided with means for recirculating water or cooled condensate over the packing may be substituted for the cooler 28. A valve in the outlet pipe 35 permits a close control in the back pressure of the converter, which is an important factor when several converters are operated in parallel, and the immediate cooling of the hot reacted gases permits the use of a control valve of ordinary construction at this point.

Because of the extremely uniform distribution of the reaction gas mixture over a single annular catalyst of uniform depth it is possible to load the catalyst heavily with a gas mixture having those ratios of methanol to oxygen or air which are best suited for the maximum yields of formaldehyde with minimum quantities of byproducts. The temperature conditions resulting from the use of such mixtures can be adjusted to any desired degree by regulating the quantity and temperature of the air introduced through the air inlet 17.

From the foregoing detailed description it is evident that the converter shown on the drawings illustrate in detail the principles of our invention. By providing the catalyst in the form of a vertical annulus we obtain a maximum of cooling surface consistent with the volume of catalyst necessary for large scale production, and it should be noted that fins or other cooling elements may be attached to the surface of the outer converter shell 2 opposite the catalyst 5 if additional cooling should prove to be necessary or desirable. The reaction gas mixture introduced through the valve 27 is evenly distributed by the orifices 23 in the inlet section 21 of the converter and passes vertically through the entire depth of the annular catalyst bed, while air or other gas under slightly positive pressure is introduced at 17 and passes through the opening 18 and upwardly through the narrow channel 16 in countercurrent heat exchanging relation with the reaction gas mixture in the annular passage 4.

What we claim is:

1. Apparatus for the manufacture of formaldehyde comprising in combination inner and outer concentric shells defining a catalyst annulus, means for passing a reaction gas mixture containing methanol and oxygen vertically through said catalyst annulus, and a vertical tube within said inner shell having openings at the lower end thereof adapted to conduct a flow of a temperature regulating gas along the inner surface of said inner shell adjacent the catalyst-containing area.

2. Apparatus for the manufacture of formaldehyde comprising in combination inner and outer concentric shells defining a catalyst containing annulus, means within said inner shell for passing a flow of temperature regulating gas along the inner surface of said shell opposite the catalyst-containing annulus, and a cooler located immediately following said catalyst-containing annulus and adapted for shock cooling of the reacted gases.

PIERRE SCHIDELER.
RALPH S. RICHARDSON.